(12) United States Patent
Schellheimer et al.

(10) Patent No.: US 10,279,406 B2
(45) Date of Patent: May 7, 2019

(54) METHOD AND DEVICE FOR GUIDING A TOOL

(71) Applicant: HOCHLAND SE, Heimenkirch (DE)

(72) Inventors: Tobias Schellheimer, Wangen (DE); Hans-Peter Schwaerzler, Weiler-Simmerberg (DE)

(73) Assignee: Hochland SE, Heimenkirch (DE)

( * ) Notice: Subject to any disclaimer, the term of this patent is extended or adjusted under 35 U.S.C. 154(b) by 179 days.

(21) Appl. No.: 15/121,832

(22) PCT Filed: Feb. 12, 2015

(86) PCT No.: PCT/EP2015/052958
§ 371 (c)(1),
(2) Date: Aug. 26, 2016

(87) PCT Pub. No.: WO2015/128198
PCT Pub. Date: Sep. 3, 2015

(65) Prior Publication Data
US 2017/0057111 A1 Mar. 2, 2017

(30) Foreign Application Priority Data

Feb. 28, 2014 (DE) ........................ 10 2014 102 713

(51) Int. Cl.
| | |
|---|---|
| *G06F 19/00* | (2018.01) |
| *B23D 55/10* | (2006.01) |
| *B23D 55/08* | (2006.01) |
| *B26D 1/08* | (2006.01) |

(Continued)

(52) U.S. Cl.
CPC ............. *B23D 55/10* (2013.01); *B23D 55/08* (2013.01); *B26D 1/08* (2013.01); *B26D 1/60* (2013.01);

(Continued)

(58) Field of Classification Search
CPC ........ B23D 53/04; B23D 55/10; B23D 55/08; B23C 3/12; A01D 34/30; B21D 28/12; F16H 55/56; A22B 5/208; H05K 13/0069
See application file for complete search history.

(56) References Cited

U.S. PATENT DOCUMENTS

| | | | |
|---|---|---|---|
| 1,924,162 A | 8/1933 | Mason | |
| 2,904,826 A * | 9/1959 | Hotard | ................... A22B 5/208 |
| | | | 452/160 |

(Continued)

FOREIGN PATENT DOCUMENTS

| | | |
|---|---|---|
| DE | 102008044465 | 4/2010 |
| JP | 1977017283 A | 2/1977 |
| WO | 0128865 A1 | 4/2001 |

*Primary Examiner* — Tuan A Vu
(74) *Attorney, Agent, or Firm* — Robert Lelkes

(57) ABSTRACT

Method and device for guiding a tool in a recurring application of a product moved along an X-axis, wherein the tool is mounted on the Z-carriage of a cross guide and is moved therewith along the Z-axis standing perpendicular on the X-axis, wherein the Z-carriage is mounted on the X-carriage of the cross guide, the guide of which is mounted along the X-axis in a base plane, wherein the X-carriage is driven with an X-drive, wherein the Z-carriage is driven by a Z-drive, which is held stationary in the base plane and has a traction means driven by a first servo motor provided for the drive of the Z-carriage, which is driven from the base plane on the movable Z-carriage, wherein a movement of the Z-carriage that is brought about by the movement of the X-carriage and a motive force caused thereby on the traction means, is compensated when actuating the first servo motor provided for the drive of the Z-carriage.

5 Claims, 3 Drawing Sheets

Figure 1:
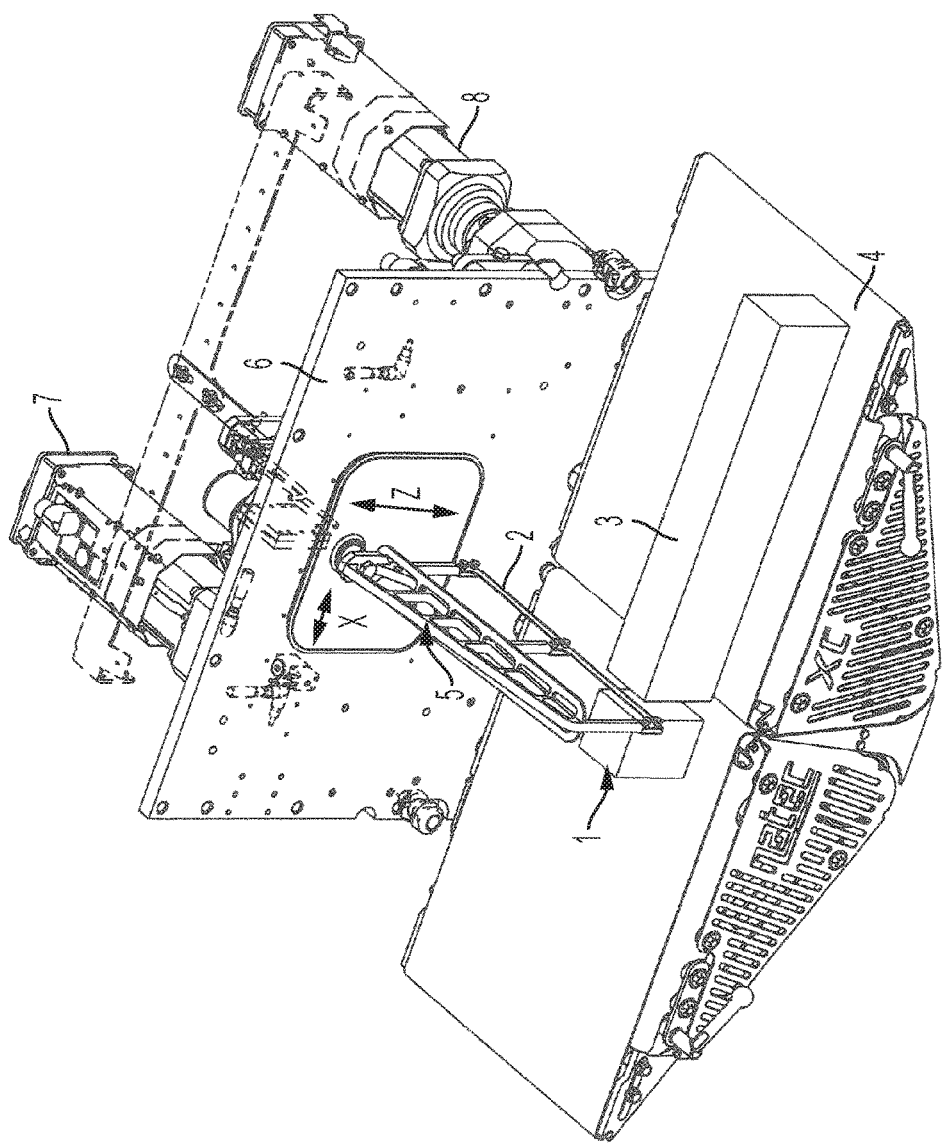

(51) Int. Cl.
*B26D 1/60* (2006.01)
*B26D 5/08* (2006.01)
*B26D 7/00* (2006.01)
*G05B 19/402* (2006.01)

(52) U.S. Cl.
CPC ............ *B26D 5/08* (2013.01); *B26D 7/0006* (2013.01); *G05B 19/402* (2013.01); *B26D 2210/02* (2013.01); *G05B 2219/36507* (2013.01)

(56) References Cited

U.S. PATENT DOCUMENTS

| | | | | |
|---|---|---|---|---|
| 3,226,995 | A * | 1/1966 | Getz | F16H 55/56 |
| | | | | 474/20 |
| 3,518,908 | A * | 7/1970 | Daniels | B21D 28/12 |
| | | | | 83/137 |
| 4,023,333 | A * | 5/1977 | Anderson | A01D 34/30 |
| | | | | 56/208 |
| 4,111,085 | A * | 9/1978 | Johnson | B23D 53/04 |
| | | | | 83/801 |
| 5,320,016 | A * | 6/1994 | Spath | B23D 53/04 |
| | | | | 83/794 |
| 2004/0128827 | A1* | 7/2004 | Shimizu | H05K 13/0069 |
| | | | | 29/739 |
| 2006/0059671 | A1* | 3/2006 | Okafuji | B23C 3/12 |
| | | | | 29/56.5 |
| 2011/0226102 | A1 | 9/2011 | Biggel et al. | |
| 2013/0000454 | A1 | 1/2013 | Miller | |
| 2013/0283988 | A1 | 10/2013 | Blokland | |
| 2017/0057111 | A1 | 3/2017 | Schellheimer et al. | |

* cited by examiner

METHOD AND DEVICE FOR GUIDING A TOOL

The present invention relates to a method and a device for guiding a tool in a repetitive motion acting on an object. In particular, the invention relates to the guidance of a transverse cutting knife for transversely cutting a raised object that is moved in the transport direction, in particular a soft food product, such as a stack of cheese bands lying on top of one another, wherein the transverse cutting takes place perpendicularly to the transport direction of the object.

Devices for the processing, in particular also for the transverse cutting, of highly diverse objects are known from a number of production processes. Reference is made to WO 01/28865 A1 in this regard. The transverse cutting of moving, relatively flat cheese bands is also known, in particular. In this regard, DE 10 2008 061 330 A1 discloses a device for cutting individual pieces from a cheese band, which is initially cut into longitudinal strips and is then fed by means of a conveyor belt to a transverse cutting device. This cuts the longitudinal strips into individual pieces during the continuous motion, wherein the transverse cutting knife is moved back to the initial position after every cut.

Whereas the transverse cutting of such a flat band can be carried out in a very easily implemented, short "chopping motion", the transverse cutting of a raised band, for example, a stack of a plurality of cheese bands lying on top of one another, requires a more complex motion sequence since the transverse cutting knife must be guided exactly perpendicularly to the movement of the band for a relatively long time during the entire cutting motion. In addition, it is highly desirable to not be limited to a single cut, but rather to have the option of cutting the bands in various lengths, for example.

In order to be capable of carrying out this type of complex cutting motions in a flexible manner, devices are used that utilize separate drives for the movement along each axis. Drives that are separated in this manner make a freely parameterizable and exact cutting sequence possible. In addition, such efficient transverse cutting devices can be used to cut endless cheese bands into individual stacks having any length, wherein no changeover times are required to change the guidance of the cut.

Known transverse cuffing devices of the type used in this technical field have a knife holder, which is held on a slide guided by means of a cross guide. Such a cross guide is a system with two axis, comprising two linear guiding systems each having one axis, whereby the cross guide enables a movement of an object in two directions usually with an offset of 90° within a plane. In the known transverse cutting devices the slide is pneumatically driven along the transverse cutting direction (Z-axis). On the other hand, the drive along the conveyance direction (X-axis) utilizes a servomotor, i.e., an electric motor, which is held on a base plate in a stationary manner, in which the angular position of the motor shaft as well as the speed of rotation and the acceleration can be controlled by means of a sensor system. With this drive, the X-axis of the transverse cutting direction is synchronized with exact positioning, according to the "flying saw" principle, with the endless cheese band that is moving in the transport direction, wherein the knife cuts along the Z-axis in this synchronized movement.

A problem associated with the known devices, however, is that, during the pneumatically driven cutting in the Z-direction, there is no information available on the actual position of the knife and thus there is no position feedback at all during the course of cutting. In addition, the increasing requirements on a greater cutting depth and speed exceed the performance limit of these systems that can be achieved such that the process is reliable. Another disadvantage of the pneumatic Z-drive is the high energy loss in the end positions of the knife.

Although some of the aforementioned problems can be avoided with a second servomotor that drives the movement in the Z-direction, this concept is not feasible for most applications insofar as the second servomotor is mounted on the slide that is moved in the Z-direction and negatively affects the motion sequence and, therefore, the energy consumption, via its own weight. For example, the dimensions of the first servomotor would have to be increased accordingly.

A gantry drive, which is known from mechanical engineering, is another drive that could be considered, in principle, for such a compound table. In this movement system, a geometrical axis of the compound table is moved by means of two separate feed motors, which are driven in an angularly synchronous manner by means of converter control. A movement in the horizontal direction is generated when the two drives are moved in an angularly synchronous manner, i.e., with the same direction of rotation and at the same speed, whereas a movement in the vertical direction is generated when the two drives are moved in opposite directions of rotation and at different speeds. Any trajectory and coordinates in the movement area can be obtained by means of the interplay between the two drive motors. Such a gantry drive is slow and has limited dynamics, however, due primarily to its relatively large mass that must be moved. For this reason, the gantry drive has not been used so far in the guidance of tools in repetitive production processes, but rather were used only for systems that can be adjusted individually, such as patient beds in therapy and diagnostic devices, for example.

The problem addressed by the present invention is therefore that of creating a method for guiding a tool, in particular a transverse cutting knife, which acts on an object, in particular a moving product, in a repetitive motion, can be carried out with simple technical means, and permits rapid, flexible, and precise handling of the tool with low energy consumption and great dynamics. Another problem addressed by the invention is that of creating an easy-to-handle device for carrying out the method.

These problems are solved by a method having the characterizing features of claim 1 and by a device according to claim 4. Advantageous embodiments of the invention are set forth in the respective dependent claims.

According to the fundamental idea of the invention, a tool that is mounted on a Z-slide of an X-/Z-cross guide is driven by a first servomotor, which is not mounted on the moving X-slide, but rather is mounted in the base plane in a stationary manner outside of the compound table. The first servomotor, which is therefore decoupled from the movement of the compound table, is equipped with a pulling means, in particular a belt, which acts on the Z-slide and pulls this in the Z-direction and simultaneously permits the Z-slide to move along the X-axis. In order to meet these conditions, the pulling means is guided along the outer contour of a T by means of redirecting rollers, wherein the X-axis forms the top bar of the T and the Z-axis forms the middle bar of the T. In this arrangement, the middle bar can be initially displaced in a parallel manner along the top bar without movement of the pulling means. In such a parallel displacement, however, a point of the pulling means located on the middle bar travels along the middle bar. As a result, a tool that is held at this point is forced to move along the Z-axis when the X-axis is displaced, provided the pulling means is fixed. A highly essential aspect of the invention is therefore that of compensating for this forced movement along the Z-axis when movement occurs along the X-axis by means of the first servomotor and/or to account therefor, by means of calculations, in the control thereof.

For this purpose, information regarding the (change in) position along the X-axis is made available to the control of the first Z-servomotor. Such position information can be obtained from the control electronics of a second servomotor provided for the X-drive and can be fed to the control electronics of the first servomotor provided for the Z-drive. Such position information could also be derived from an external sensor system that registers the (change in) position along the X-axis.

In other words, the fundamental idea of the invention is that of initially using a drive system with which a movement along the X-axis is directly coupled to a movement along the Z-axis such that a movement in the X-axis induces a "synchronous" compensation motion in the Z-axis. Since this compensation motion is unwanted during operation, this superposed motion is compensated for, for the Z-axis, by the control of the first servomotor. The feedback coupling even results in the effect that a movement in the X-axis can support the movement of the Z-axis that is necessary for the process sequence.

The invention is therefore manifested in that the X-slide is driven by an X-drive and the Z-slide is driven by a Z-drive, wherein the Z-drive is mounted in the base plane in a stationary manner and comprises a pulling means, in particular a belt, which is driven by a first servomotor. This pulling means is guided on the Z-slide from the base plane, wherein a movement of the Z-slide that is caused by a movement of the X-slide and a resultant displacement of the pulling means along the Z-axis is compensated for in the control of the Z-drive.

For the compensation, it is advantageous if the movement of the X-slide is registered, in particular, on the basis of the control data for a second servomotor driving the X-slide, and this value is taken into account, for the purpose of the compensation, as an input variable in the control of the X-drive during the action motion of the Z-slide.

A characteristic feature of the idea according to the invention is that it can be used anywhere in which a tool held on a compound table is used to act on an object, in a repetitive motion along a predefinable trajectory, in the axis that is moved along the other axis of the compound table. The invention makes it possible for the tool to temporarily dwell in the moving coordinate system of the object during the handling in which the action is carried out.

A typical application of the invention is the transverse cutting in the Z-direction of a product band, which is moved in a transport direction (X-direction) perpendicular to the Z-direction and is, for example, several centimeters thick, wherein said product band can be formed by a layered food product having a pasty consistency, such as processed cheese, for example.

It is particularly advantageous that, due to the biaxial drive according to the invention having the first servomotor, at least for the Z-drive, which is held in the base plane—and, advantageously, having a second servomotor for the X-drive—the mass that is moved with the slide is kept low such that motion sequences of the tool mounted on the cross guide that are particularly rapid and simultaneously precise are made possible. Due to the weight reduction of the moving mass and the performance increase, it is possible to integrate additional modules, such as a diagonal cut or an interlayer cut, for example.

In all, the invention results in an increase in functional reliability since the cutting sequence is completely regulated since there is constant feedback and monitoring of the setpoint/actual position of the tool in the dynamic motion sequence. In addition, high energy efficiency is given since energy is recovered in the end positions via the servotechnology and is not wasted as in the case of the pneumatic drive of the Z-axis. The result thereof is a longer service life and low-wear functioning. The servomotors also make it possible to increase the processing output (timing rate) as well as the cutting output.

A particularly great advantage of the invention is the flexibility of the tool guidance, which in the case of transverse cutting makes it possible to cut any formats without mechanical retooling. In addition, due to its symmetrical design, the device can be operated symmetrically in both directions of motion along the X-axis. With the same device, it is possible to switch from right-hand motion to left-hand motion.

Figure 2:
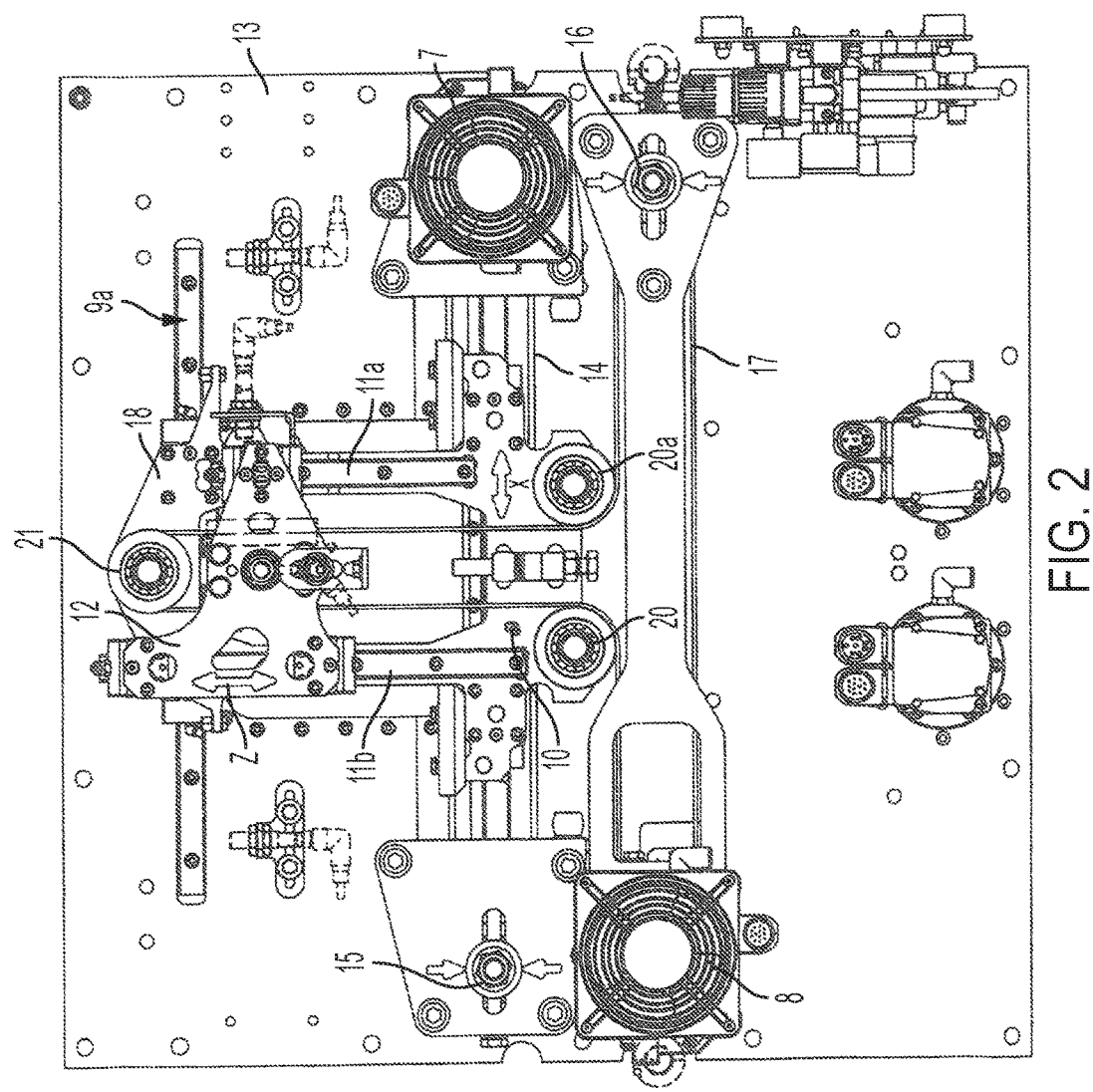
Figure 3:
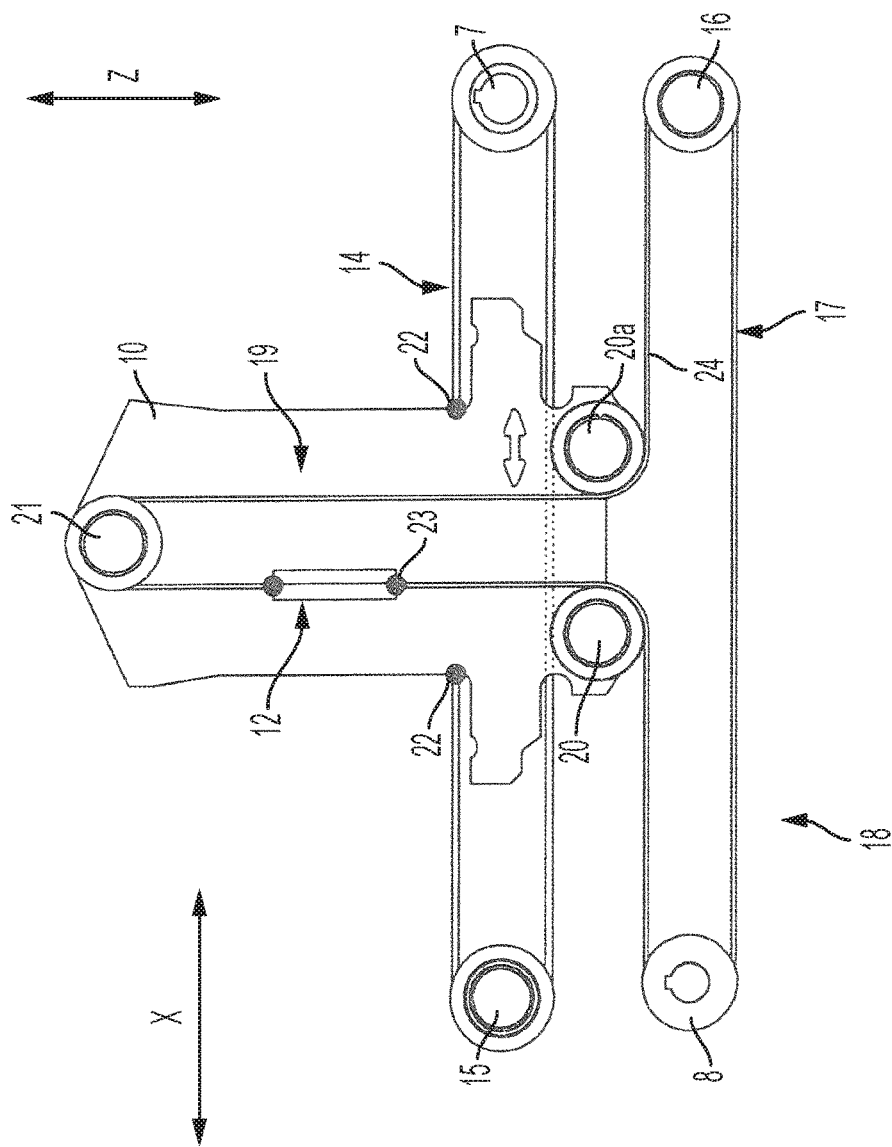

A special embodiment of the invention is shown in FIGS. 1 to 3 and is described in greater detail in the following. Therein:

FIG. 1 shows the transverse cutting knife of a device according to the invention during operation, and FIG. 2 shows the drive of the transverse cutting knife, and FIG. 3 shows a schematic diagram of the drive.

FIG. 1 schematically shows a transverse cutting module of the type that can be used in the production process for producing a single stack 1 of cheese slices. Such a single stack 1 is cut off of a stack 3 of cheese bands, which have been placed on top of one another, by means of a transverse cutting knife 2, wherein said cheese bands move on a conveyor belt 4 continuously in the transport direction along the X-axis (arrow X), which is on the horizontal in this case. The transverse cutting of the stack 3 takes place, during the transport, along a Z-axis (arrow Z), which extends vertically in this example. The narrow transverse cutting knife 2, which is mounted on the lower edge of a holding frame 5, acts on the stack 3 in a repetitive, cutting manner along a predefined motion curve. In this connection, the transverse cutting knife 2 is guided to the point of the stack 3 at which the cut starts. It is then guided along with the transport motion of the stack 3 along the X-axis and simultaneously executes a cut along the Z-axis. After the cut is completed, the transverse cutting knife 2 is raised up and out and is guided rearward to the next starting point. The motion curve for this cutting action is predefined with respect to the product and the production cycle and is driven by two independent drives in the form of servomotors 7 and 8, which are located behind a plate 6 and are fixedly mounted there.

FIG. 2 shows the back side of the plate, on which the servomotors 7 and 8 are located, each of which is controlled by non-illustrated, programmable control electronics. Since information regarding the momentary rotational angle of the servomotors is available, the control electronics know the actual position of both servomotors and can account for the current position of one in the control of the other. A compensation means is therefore implemented in the control electronics for controlling the two servomotors and, in the control of one of the two servomotors, accounts for the control parameters of the respective other servomotor. In this manner, it is possible, in particular, to compensate for a motion of the transverse cutting knife 2 in the Z-direction that is caused by movement in the X-direction, in the control of the Z-drive. The influence on the movement in the Z-direction by a movement in the X-direction is described with reference to FIG. 2.

As is evident from FIG. 2, the device comprises a cross guide having two slides, namely an X-slide 10, which is guided by means of an X-guide having the rails 9a, 9b, and a Z-slide 12, which is guided by means of a Z-guide having the rails 11a, 11b. The transverse cutting knife is held on the Z-slide and the rails 11a, 11b for the Z-slide are mounted on the X-slide 10, as shown. In contrast, the rails 9a, 9b for the X-slide are mounted in a stationary manner on a base plane 13 (base plate).

The X-drive for driving the X-slide takes place by means of the second servomotor 7, which is mounted on the base plane 13 and drives a pulling means in the form of a belt 14. The X-slide is fixedly coupled to the belt 14 and is pulled forward or backward along the X-axis by this belt, depending on the direction of rotation of the second servomotor 7. The belt 14 is redirected by means of a redirection roller 15, which is mounted "coaxial" with the second servomotor 7, relative to the X-axis, on the base plane 13.

The drive of the Z-slide 12 is designed similarly to that of the X-slide 10 and also has a first servomotor 8, which is held in the base plane in a stationary manner, and a redirection roller 16, which is mounted "coaxial" with the first servomotor 8, relative to the X-axis, on the base plane 13. The first servomotor 8 and the redirection roller 16 therefore form two redirections that are held in the base plane. The first servomotor 8 drives a pulling means in the form of a belt 17. In the case of the Z-drive, the belt 17 is guided in a T-shaped path, which has an X-leg with bottom pull 18 and top pull 24 and a Z-leg 19.

The operating method of the drive of the compound table via the belts is illustrated in FIG. 3. The movement of the X-slide 10 in the X-direction (arrow) is driven by the second servomotor 7, which acts on the X-slide 10 via the belt 14. The belt 14 is fixed on the X-slide 10 at the points 22. The drive of the Z-slide 12 with the first servomotor 8, which is held in a stationary manner, utilizes the belt 17, which is guided in a T-shaped path and the top pull 24 of which branches off in a loop, which forms the Z-leg 19, via two tension rollers 20 and 20a held on the X-slide 10. The belt 17 is redirected via a roller 21, which is held on the X-slide 10 at the end of the Z-leg 19. The Z-slide 12 is held on the belt 17 at the points 23 and is moved in the Z-direction (arrow) on the X-slide via the belt 17.

As is evident from the schematic diagram according to FIG. 3, a movement of the X-slide with the belt 17 fixedly held causes the Z-slide 12 to move, since the loop forming the Z-leg 19 is displaced and the Z-slide 12 fixed at a point 23 of the belt 17 moves relative to the X-slide. According to the invention, a compensation means is now available, which undertakes the control of the two servomotors 7 and 8 such that this movement of the Z-slide caused by the movement of the X-slide is compensated for by the Z-drive at least to the extent that is necessary for the desired motion sequence of the transverse cutting knife held on the Z-slide 12.

As described above, the method and the device for guiding a tool in a repetitive action on an object moving along the X-axis provides in a preferred embodiment the following: A device (forming a cross-drive) comprising an X-slide 10 capable of moving solely along the X-axis, a Z-slide 12 mounted on the X-slide 10 capable of moving perpendicular to the X-axis, and a tool 2 mounted on the Z-slide 12. The X-slide 10 is driven with an X-drive whereby in a preferred embodiment the X-slide 10 engaged with a second belt 14 engaged with a second servomotor drive 7 and a second fixed pulley 15 for moving the X-slide along the X-axis. The Z-slide 12 is engaged with a first belt 17, which is engaged with a first servomotor drive 8 and a second fixed pulley 16.

In that embodiment, at least the first servomotor drive 8 and the first fixed pulley 16 and, when present, the second servomotor drive 7 and the second fixed pulley 15, are mounted at fixed locations relative to each other. The X-slide 10 comprises a first traveling pulley 20 and a second traveling pulley 20a, wherein the first traveling pulley 20 and the second traveling pulley 20a are each fixedly mounted on the X-slide below the Z-slide 12 and redirecting the belt 14 from a horizontal direction to a vertical direction. The X-slide 10 further comprises a third traveling pulley 21, wherein the third traveling pulley 21 is fixedly mounted on the X-slide above the Z-slide 12 and redirecting the belt 14 from the first traveling pulley 20 to the second traveling pulley 20a, whereby the Z-slide 12 may be engaged with the belt 14 between the first traveling pulley 20 and the third traveling pulley 21 for driving the Z-slide 12 perpendicular to the X-axis.

An article 3 moving along the X-axis may be provided, which moves along the X-axis. In a preferred embodiment, the X-slide 10 is driven along the X-axis by the second servomotor drive 7 via the second belt 14, while the Z-slide 12 is driven along the Z-axis with the first servomotor drive 8 via the first belt 17. As described above, the first servomotor drive 8 is controlled such that a movement of the Z-slide 12 caused by movement of the X-slide 10 and the resultant tractive force on the first belt 17 is compensated.

For that, advantageously the movement of the X-slide 10 is registered and used as an input variable for controlling the second servomotor drive 8.

The device may further comprise an electronic control device for controlling the second servomotor drive 7 and the first servomotor drive 8 for coordinating movement of the tool 2 via the second servomotor drive 7 and first servomotor drive 8.

The invention claimed is:
1. A device for guiding a tool in a repetitive action on a moving product, wherein the device comprises a cross guide, wherein the tool is held on a Z-slide, the guidance of which defines the Z-axis of the cross guide, wherein the Z-slide is movably held on an X-slide, the guidance of which defines the X-axis, which is perpendicular to the Z-axis, wherein the guidance along the X-axis is mounted in a base plane,
wherein
an X-drive is provided to drive the X-slide,
for the drive of the Z-slide, a Z-drive is held in the base plane in a stationary manner, said Z-drive comprising a belt driven by a first servomotor provided for the drive of the Z-slide, wherein the belt is guided in a T-shaped path, which has an X-leg and a Z-leg, wherein the X-leg extends around two pulleys held in the base plane and forms a top pull and a bottom pull, wherein the top pull branches via a first tension roller and a second tension roller held on the Z-slide into a loop forming the Z-leg, said loop being guided around another redirection roller, which is held on the X-slide at the end of the Z-section, wherein a compensation device is provided for controlling the first servomotor provided for the drive of the Z-slide so as to compensate for a movement of the Z-slide caused by a movement of the X-slide.

2. The device according to claim 1,
wherein
one of the redirections is a redirection roller, which is drivable by the first servomotor provided for the drive of the Z-slide is mounted on the shaft of the first servomotor provided for driving the Z-slide.

3. The device according to claim 1,
wherein
the X-drive comprises a belt, which is operated by a second servomotor and is redirected in a loop in the base plane.

4. The device according to claim 1,
wherein
the tool is a transverse cutting knife, which is adapted for cutting-, in a repetitive cutting process, a product moving at a conveyance speed in the conveyance direction along the X-axis.

5. The device according to claim 1,
wherein
the compensation device is implemented in the control electronics for controlling the two servomotors and, in the control of one of the two servomotors, accounts for the control parameters of the respective other servomotor.

* * * * *

UNITED STATES PATENT AND TRADEMARK OFFICE
CERTIFICATE OF CORRECTION

PATENT NO. : 10,279,406 B2
APPLICATION NO. : 15/121832
DATED : May 7, 2019
INVENTOR(S) : Schellheimer et al.

Page 1 of 1

It is certified that error appears in the above-identified patent and that said Letters Patent is hereby corrected as shown below:

In the Specification

Column 1, Line 44, Delete "cuffing" and insert --cutting-- therefor
Column 6, Line 6, Delete "second" and insert --first-- therefor
Column 6, Line 35, Delete "8." and insert --7.-- therefor In the Claims Column 7, Line 15, In Claim 4, delete "cutting-," and insert --cutting,-- therefor Signed and Sealed this
Twenty-fifth Day of August, 2020

Andrei Iancu
*Director of the United States Patent and Trademark Office*